(12) United States Patent
Ido et al.

(10) Patent No.: US 10,240,445 B2
(45) Date of Patent: Mar. 26, 2019

(54) FRACTURING FLUID VISCOSITY-CONTROLLING AGENT TO BE USED IN HYDRAULIC FRACTURING

(71) Applicant: SUMITOMO SEIKA CHEMICALS CO., LTD., Hyogo (JP)

(72) Inventors: Toru Ido, Hyogo (JP); Noboru Yamaguchi, Hyogo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

(21) Appl. No.: 14/897,340

(22) PCT Filed: Jun. 9, 2014

(86) PCT No.: PCT/JP2014/065198
§ 371 (c)(1),
(2) Date: Dec. 10, 2015

(87) PCT Pub. No.: WO2014/199938
PCT Pub. Date: Dec. 18, 2014

(65) Prior Publication Data
US 2016/0115374 A1   Apr. 28, 2016

(30) Foreign Application Priority Data

Jun. 10, 2013   (JP) .................. 2013-121803

(51) Int. Cl.
*E21B 43/26* (2006.01)
*C09K 8/70* (2006.01)
(Continued)

(52) U.S. Cl.
CPC .............. *E21B 43/26* (2013.01); *C09K 8/68* (2013.01); *C09K 8/70* (2013.01); *C09K 8/725* (2013.01);
(Continued)

(58) Field of Classification Search
None
See application file for complete search history.

(56) References Cited

U.S. PATENT DOCUMENTS 3,747,681 A * 7/1973 Davis, Jr. ................. C09K 8/62
166/307
4,202,795 A * 5/1980 Burnham ............. B01D 17/047
166/308.1
(Continued)

FOREIGN PATENT DOCUMENTS

EP   0280341 A1   8/1988
EP   2660298 A1   11/2013
(Continued)

OTHER PUBLICATIONS

The extended European search report issued by European Patent Office on Dec. 16, 2016 in the corresponding European Patent Application No. 14811175.0.
(Continued)

*Primary Examiner* — Anuradha Ahuja
(74) *Attorney, Agent, or Firm* — Knobbe, Martens, Olson & Bear, LLP

(57) ABSTRACT

A fracturing fluid viscosity-controlling agent maintains the high viscosity of the fracturing fluid during fracture formation in hydraulic fracturing and reduces the viscosity during recovery of the fracturing fluid. A fracturing fluid which includes the viscosity-controlling agent is provided as well as a crude oil or natural gas drilling method using the fracturing fluid with the viscosity-controlling agent. This viscosity-controlling agent contains polyalkylene oxide and a viscosity-reducing agent and is in the form of a tablet.

7 Claims, 3 Drawing Sheets

(51) Int. Cl.
*C09K 8/68* (2006.01)
*C09K 8/72* (2006.01)
*C09K 8/88* (2006.01)

(52) U.S. Cl.
CPC ............... *C09K 8/88* (2013.01); *C09K 8/885* (2013.01); *C09K 2208/26* (2013.01)

(56) References Cited

U.S. PATENT DOCUMENTS

| | | | |
|---|---|---|---|
| 4,610,795 A | 9/1986 | Norris et al. | |
| 4,741,401 A * | 5/1988 | Walles | C09K 8/685 166/300 |
| 5,164,099 A | 11/1992 | Gupta et al. | |
| 5,370,184 A * | 12/1994 | McDougall | C09K 8/665 166/278 |
| 5,591,700 A * | 1/1997 | Harris | C09K 8/68 507/214 |
| 7,204,312 B2 * | 4/2007 | Roddy | C04B 40/0641 166/292 |
| 2003/0234103 A1 * | 12/2003 | Lee | C09K 8/516 166/293 |
| 2004/0063588 A1 | 4/2004 | Rose et al. | |
| 2008/0032949 A1 | 2/2008 | Jones et al. | |
| 2011/0287077 A1 | 11/2011 | Jones et al. | |
| 2012/0012320 A1 | 1/2012 | Weaver et al. | |
| 2013/0022657 A1 | 1/2013 | Jones et al. | |
| 2013/0288934 A1 | 10/2013 | Powell et al. | |

FOREIGN PATENT DOCUMENTS

| | | |
|---|---|---|
| JP | 62-033995 A | 2/1987 |
| RU | 2 256 727 C1 | 7/2005 |
| RU | 2 333 642 C2 | 3/2008 |
| WO | WO 01/94744 A1 | 12/2001 |
| WO | WO 2004/031320 A1 | 4/2004 |
| WO | WO 2006/088603 A1 | 8/2006 |
| WO | WO 2012/036862 A1 | 3/2012 |

OTHER PUBLICATIONS

International Search Report for International Application No. PCT/JP2014/065198, dated Aug. 12, 2014.
Russian Office Action in Application No. RU2015156645 with English Translation dated Jan. 9, 2018 in 12 pages.
Office Action for Russian Patent Application No. 2015156645 dated Sep. 6, 2018.

* cited by examiner

Number of days of storing fracturing fluids at 40°C [day]

Number of days of storing fracturing fluids at 40°C [day]

FRACTURING FLUID VISCOSITY-CONTROLLING AGENT TO BE USED IN HYDRAULIC FRACTURING

CROSS-REFERENCE TO RELATED APPLICATIONS

This application is the U.S. National Phase under 35 U.S.C. § 371 of International Application PCT/JP2014/065198, filed Jun. 9, 2014, which claims priority to JP 2013-21803, filed Jun. 10, 2013.

TECHNICAL FIELD

The present invention relates to a viscosity controlling agent for a fracturing fluid to be used in hydraulic fracturing.

BACKGROUND ART

Hydraulic fracturing has been heretofore conducted in mining of crude oil, natural gas and the like, and in recent years, utilization of hydraulic fracturing has spread with advancement of techniques for mining shale gas and shale oil.

In hydraulic fracturing, a high pressure is applied to the inside of a well to form a fracture (crack) in a mining layer, a support material such as sand is introduced into the fracture to prevent the fracture from being closed, and a passage having high permeability to gas or oil is provided in the mining layer to mine gas or oil. In application of a high pressure to the inside of a well, generally a high-viscosity fracturing fluid with a support material (e.g. sand), a gelling agent and so on contained in water is injected under pressure.

Such a fracturing fluid is required to have a viscosity which ensures that a sufficient fracture can be formed in a mining layer and a support material such as sand can be carried to the fracture. Further, the fracturing fluid is recovered from the inside of the well after formation of the fracture, and is therefore required to have a reduced viscosity during recovery. Therefore, the fracturing fluid is desired to be designed in such a manner that it has a sufficiently high viscosity during fracture formation operation, and has a reduced viscosity during fracturing fluid recovery operation, and is thus easily recovered.

For example, Patent Document 1 discloses an aqueous composition to be used as a fracturing fluid, the aqueous composition containing (1) a hydrating polymer, (2) a peroxo compound substantially capable of generating free radicals in an amount sufficient to reduce the viscosity of an aqueous medium, and (3) a nitrite ion source. In Patent Document 1, a technique is proposed in which free radicals generated by the peroxo compound that reduces the viscosity of the aqueous composition are trapped by the nitrite ion source to suppress an early reduction in viscosity of the fracturing fluid which is caused by the peroxo compound.

PRIOR ART DOCUMENT

Patent Document

Patent Document 1: Japanese Patent Laid-open Publication No. 62-33995

SUMMARY OF THE INVENTION

Problems to be Solved by the Invention

However, in a conventional fracturing fluid as disclosed in, for example, Patent Document 1, a reduction in viscosity of the fracturing fluid can be suppressed, but it is difficult to control a change in viscosity of a fracturing fluid in various timings.

A main object of the present invention is to provide a viscosity controlling agent for a fracturing fluid, which is capable of causing a fracturing fluid to retain a high viscosity during fracture formation operation in hydraulic fracturing and to have a reduced viscosity during fracturing fluid recovery operation; a fracturing fluid containing the viscosity controlling agent; and a method for mining crude oil or natural gas using the fracturing fluid.

Means for Solving the Problems

The present inventors have extensively conducted studies for solving problems as described above. As a result, the present inventors have found that a viscosity controlling agent which is used for controlling a change in viscosity of a fracturing fluid to be used in hydraulic fracturing, the viscosity controlling agent containing a polyalkylene oxide and a viscosity reducing agent and being in the form of a tablet, is capable of causing the fracturing fluid to retain a high viscosity during fracture formation operation in hydraulic fracturing and to have a reduced viscosity during fracturing fluid recovery operation. The present invention has been completed by further conducting studies based on these findings.

The present invention provides an invention having the aspects described below.

Item 1. A viscosity controlling agent which is used for controlling a change in viscosity of a fracturing fluid to be used in hydraulic fracturing,
the viscosity controlling agent containing a polyalkylene oxide and a viscosity reducing agent and being in the form of a tablet.

Item 2. The viscosity controlling agent according to item 1, wherein the ratio of the polyalkylene oxide in the viscosity controlling agent is 30 to 99.99% by mass.

Item 3. The viscosity controlling agent according to item 1 or 2, wherein the mass of the tablet is 0.2 g or more.

Item 4. The viscosity controlling agent according to any one of items 1 to 3, wherein the polyalkylene oxide has a viscosity of 20 to 1,500 mPa·s in the form of a 0.5 mass % aqueous solution at 25° C., or a viscosity of 50 to 80,000 mPa·s in the form of a 5 mass % aqueous solution at 25° C.

Item 5. The viscosity controlling agent according to any one of items 1 to 4, wherein the viscosity reducing agent is at least one selected from the group consisting of a radical generator, an acid and an enzyme.

Item 6. The viscosity controlling agent according to any one of items 1 to 5, wherein the carbon number of a monomer unit that forms the polyalkylene oxide is 2 to 4.

Item 7. The viscosity controlling agent according to any one of items 1 to 6, wherein the polyalkylene oxide contains at least one monomer unit selected from the group consisting of an ethylene oxide unit, a propylene oxide unit and a butylene oxide unit.

Item 8. The viscosity controlling agent according to any one of items 1 to 7, wherein the polyalkylene oxide is at least one selected from the group consisting of a polyethylene oxide, a polypropylene oxide, a polybutylene oxide, an ethylene oxide-propylene oxide copolymer, an ethylene oxide-butylene oxide copolymer and a propylene oxide-butylene oxide copolymer.

Item 9. Use of a tablet containing a polyalkylene oxide and a viscosity reducing agent for controlling a change in viscosity of a fracturing fluid to be used in hydraulic fracturing.

Item 10. A fracturing fluid which is used in hydraulic fracturing, the fracturing fluid containing the viscosity controlling agent according to any one of items 1 to 8, water, a support material and a gelling agent.

Item 11. A method for controlling a change in viscosity of a fracturing fluid to be used in hydraulic fracturing, the method including using a tablet containing a polyalkylene oxide and a viscosity reducing agent.

Item 12. A method for mining crude oil or natural gas, the method including the steps of:

forming a mining hole in a stratum;

introducing the fracturing fluid according to item 11 into the mining hole to form a fracture in a part of the stratum; and mining crude oil or natural gas from the mining hole.

Advantages of the Invention

According to the present invention, there can be provided a viscosity controlling agent for a fracturing fluid, which is capable of causing a fracturing fluid to retain a high viscosity during fracture formation operation in hydraulic fracturing and to have a reduced viscosity during fracturing fluid recovery operation. Further, according to the present invention, there can be provided a fracturing fluid containing the viscosity controlling agent; and a method for mining crude oil or natural gas using the fracturing fluid.

EMBODIMENTS OF THE INVENTION

Figure 1:
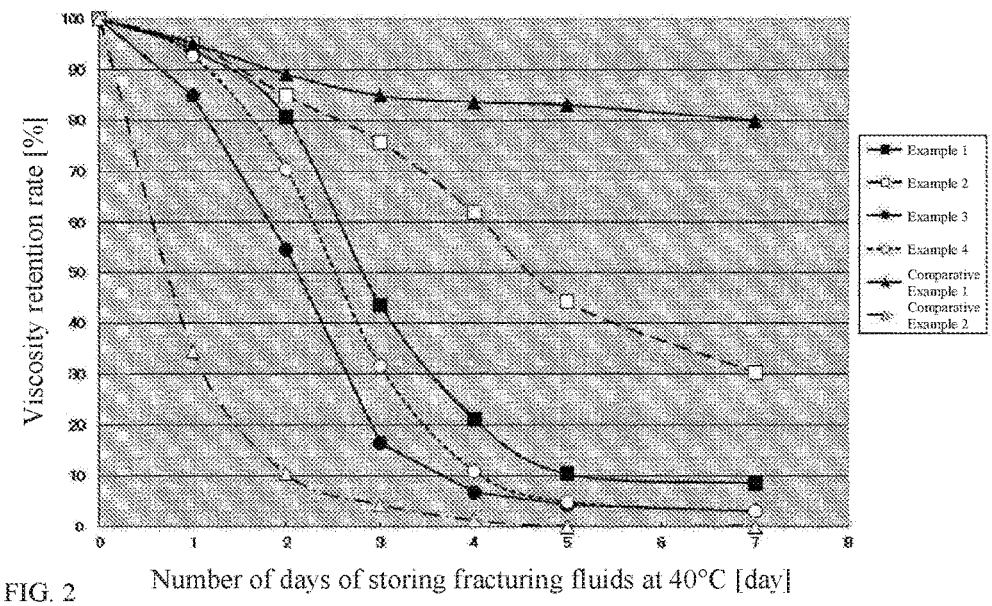
FIG. 1 is a graph showing a relationship between the number of days of storing fracturing fluids containing viscosity controlling agents obtained in Examples 1 to 4 and Comparative Examples 1 and 2 at 40° C. and the viscosity retention rate.

A viscosity controlling agent according to the present invention is a viscosity controlling agent which is used for controlling a change in viscosity of a fracturing fluid to be used it hydraulic fracturing, the viscosity controlling agent containing a polyalkylene oxide and a viscosity reducing agent and being in the form of a tablet. Hereinafter, the viscosity controlling agent for a fracturing fluid according to the present invention, the fracturing fluid, and a method for mining crude oil or natural gas using the fracturing fluid will be described in detail.

<Viscosity Controlling Agent>

The viscosity controlling agent according to the present invention is a viscosity controlling agent which is used for controlling a change in viscosity of a fracturing fluid to be used it hydraulic fracturing. The hydraulic fracturing refers to a method in which in mining of, for example, crude oil or natural gas, a high pressure is applied to the inside of a well to form a fracture (crack) in a mining layer, a support material such as sand is introduced into the fracture to prevent the fracture from being closed, and a passage having high permeability to gas or oil is provided in the mining layer.

The fracturing fluid is a fluid that is used in hydraulic fracturing and injected under pressure into a well as described above. Generally, a fracturing fluid which is used in hydraulic fracturing is mainly composed of water, and contains a support material (proppant) such as sand or gravel, a gelling agent and so on. As described later, the fracturing fluid according to the present invention contains the viscosity controlling agent according to the present invention.

The viscosity controlling agent according to the present invention contains a polyalkylene oxide and a viscosity reducing agent, and is in the form of a tablet. The polyalkylene oxide is not particularly limited as long as it contains an alkylene oxide as a monomer unit, but for effectively controlling a change in viscosity of the fracturing fluid (i.e. causing the fracturing fluid to retain a high viscosity during fracture formation operation in hydraulic fracturing and to have a reduced viscosity during fracturing fluid recovery operation), the polyalkylene oxide is preferably one having a viscosity of about 20 to 1,500 mPa·s, more preferably about 20 to 1,000 mPa·s in the form of a 0.5 mass % aqueous solution at 25° C. For the same reason, the polyalkylene oxide is preferably one having a viscosity of 50 to 80,000 mPa·s, more preferably about 100 to 80,000 mPa·s in the form of a 5 mass % aqueous solution at 25° C. In the present invention, the method for measuring the viscosity of the polyalkylene oxide in the form of a 0.5 mass % aqueous solution is as follows. In a 1-L beaker, 497.5 c? of ion-exchanged water is added, 2.5 g of a polyalkylene oxide is added therein while stirring is performed under the condition of a tip circumferential speed of 1.0 m/s using a flat plate with a width of 80 mm and a length of 25 mm, and stirring is continued for 3 hours to prepare an aqueous solution. The obtained aqueous solution is placed in a thermostatic bath at 25° C. for 30 minutes or more, and the viscosity is measured using a B-type rotational viscometer (rotation number: 12 rpm, 3 minutes, 25° C.). The method for measuring the viscosity in the form of a 5 mass % aqueous solution is as follows. In a 1-L beaker, 475.0 g of ion-exchanged water is added, 25.0 g of a polyalkylene oxide is added therein while stirring is performed under the condition of a tip circumferential speed of 1.0 m/s using a flat plate with a width of 80 mm and a length of 25 mm, and stirring is continued for 3 hours to prepare an aqueous solution. The obtained aqueous solution is placed in a thermostatic bath at 25° C. for 30 minutes or more, and the viscosity is measured using a B-type rotational viscometer (rotation number: 12 rpm, 3 minutes, 25° C.).

For effectively controlling a change in viscosity of the fracturing fluid, the carbon number of the monomer unit that forms the polyalkylene oxide is preferably about 2 to 4, more preferably about 2 to 3.

The alkylene oxide unit is preferably aliphatic alkylene oxide unit with a carbon number 2 to 4, such as an ethylene oxide unit, a propylene oxide unit or a butylene oxide unit, more preferably an aliphatic alkylene oxide unit with a carbon number of 2 to 3, such as an ethylene oxide unit or a propylene oxide unit. Examples of the propylene oxide unit include a 1,2-propylene oxide unit and a 1,3-propylene oxide unit. Examples of the butylene oxide unit include a 1,2-butylene oxide unit, a 2,3-butylene oxide unit and an isobutylene oxide unit. One of these alkylene oxide units may be contained alone, or two or more of these alkylene oxide units may be contained. The polyalkylene oxide may be a block copolymer or random copolymer containing at least one of these alkylene oxide units.

Specific examples of especially preferred polyalkylene oxides include polyethylene oxides, polypropylene oxides, polybutylene oxides, ethylene oxide-propylene oxide copolymers, ethylene oxide-butylene oxide copolymers and propylene oxide-butylene oxide copolymers. These copolymers may be either block copolymers or random copolymers. The polyalkylene oxides may be used alone, or may be used in combination of two or more thereof.

The polyalkylene oxide may he produced by a previously known method, or a commercial product may be used as the polyalkylene oxide. Examples of the commercial product of the polyalkylene oxide include PEO-1 (viscosity of 5 mass % aqueous solution: 50 to 200 mPa·s), PEO-3 (viscosity of 5 mass % aqueous solution: 2,500 to 5,500 mPa·s), PEO-8 (viscosity of 0.5 mass % aqueous solution: 20 to 70 mPa·s), PEO-18 (viscosity of 0.5 mass % aqueous solution: 250 to 430 mPa·s and PEO-29 (viscosity of 0.5 mass % aqueous solution: 800 to 1,000 mPa·s), each of which is manufactured by Sumitomo Seika Chemicals Company, Limited. "PEO" is a registered trademark possessed by Sumitomo Seika Chemicals Company, Limited.

The viscosity reducing agent is not particularly limited as long as it reduces the viscosity of the fracturing fluid, and examples thereof include radical generators, acids and enzymes. The viscosity reducing agents may be used alone, or may be used in combination of two or more thereof. As described above, the fracturing fluid contains water, a support material and a gelling agent, and the viscosity of the water is increased by the gelling agent. The viscosity reducing agent has a function of reducing the viscosity of the fracturing fluid by acting on the gelling agent etc. in the fracturing fluid, and may be called a breaker.

The radical generator (which may be referred to as a radical initiator in the present description) to be used as a viscosity reducing agent is not particularly limited, and one that is known may be used. Specific examples thereof include azo-based radical generators such as 2,2'-azobis(2, 4'-dimethylvaleronitrile) (ADVN); peroxides such as hydrogen peroxide, peroxydisulfuric acid salts and t-butyl hydroperoxide; and ammonium salts of monopersulfuric acid, alkali metal salts of monopersulfuric acid, ammonium salts of dipersulfuric acid, alkali metal salts of dipersulfuric acid, alkali metal salts or alkali earth metal salts of hypochlorous acid and chlorinated isocyanurates. In the case where, for example, a hydrating polymer compound as described later is used as the gelling agent in the fracturing fluid, the molecular weight of the hydrating polymer compound decreases because the viscosity controlling agent contains a radical generator, and thus the viscosity of the fracturing fluid can he effectively reduced.

The acid to be used as a viscosity reducing agent is not particularly limited, and one that is known may be used. Specific examples thereof include hydrochloric acid, sulfuric acid and fumaric acid.

The enzyme to be used as a viscosity reducing agent is not particularly limited, and one that is known may be used. Specific examples thereof include α-amylase, β-amylase, amyloglucosidase, oligoalucosidase, saccharase, maltase, cellulose and hemicellulase. In the case where, for example, a polysaccharide as described later is used as the gelling agent in the fracturing fluid, the glycoside bond in the polysaccharide is hydrolyzed because the viscosity controlling agent contains an enzyme, and thus the viscosity of the fracturing fluid can be effectively reduced.

The viscosity controlling agent may contain other components in addition to a polyalkylene oxide and a viscosity reducing agent as long as the effect of the present invention is not hindered.

The viscosity controlling agent according to the present invention contains the above-mentioned polyalkylene oxide and viscosity reducing agent, and is in the form of a tablet, whereby a reduction in viscosity of the fracturing fluid can be effectively controlled. That is, in the fracturing fluid, the tablet is slowly dissolved, so that the viscosity of the fracturing fluid is kept high during a predetermined period of time, and after elapse of the predetermined period of time, the viscosity reducing agent is dispersed in the fracturing fluid, so that the viscosity of the fracturing fluid can be reduced. Specifically, when the viscosity controlling agent according to the present invention is used in the fracturing fluid during fracture operation in hydraulic fracturing, the viscosity controlling agent according to the present invention is slowly dissolved in the fracturing fluid, so that the viscosity of the fracturing fluid is kept high over a long period of time during fracture formation operation in hydraulic fracturing. During fracturing fluid recovery operation after elapse of the predetermined period of time, the polyalkylene oxide and the viscosity reducing agent in the tablet are dissolved in the fracturing fluid, and the viscosity reducing agent is dispersed to act on the gelling agent in the fracturing fluid, so that the viscosity of the fracturing fluid can be reduced.

The ratio of the polyalkylene oxide in the viscosity controlling agent according to the present invention can be appropriately set according to a predetermined period of time during which the viscosity of the fracturing fluid is changed from a high viscosity to a low viscosity, and this ratio is preferably about 30 to 99.99% by mass, more preferably about 50 to 99.99% by mass, further preferably about 70 to 99.9% by mass. As the ratio of the polyalkylene oxide in the viscosity controlling agent increases, dispersion (dissolution) of the viscosity reducing agent in the fracturing fluid becomes slower, and therefore a period of time until the viscosity is decreased to a viscosity suitable for recovery of the fracturing fluid can be increased. On the other hand, as the ratio of the polyalkylene oxide in the viscosity controlling agent decreases, dispersion (dissolution) of the viscosity reducing agent in the fracturing fluid becomes faster, and therefore a period of time until the viscosity is decreased to a viscosity suitable for recovery of the fracturing fluid can be reduced.

In the viscosity controlling agent according to the present invention, the mass (size) of the tablet can be appropriately set according to a predetermined period of time during which the viscosity of the fracturing fluid is changed from a high viscosity to a low viscosity, and the mass of the tablet is preferably 0.2 g or more, more preferably about 0.2 to 10 g, further preferably about 0.5 to 2 g. As the mass of the tablet increases, dispersion dissolution) of the viscosity reducing agent in the fracturing fluid becomes slower, and therefore a period of time until the viscosity is decreased to a viscosity suitable for recovery of the fracturing fluid can be increased. On the other hand, as the mass of the tablet decreases, a period of time until the viscosity is decreased to a viscosity suitable for recovery of the fracturing fluid can be reduced.

The use amount of the viscosity controlling agent according to the present invention is not particularly limited, and may be appropriately set according to the set viscosity of an intended fracturing fluid during fracture formation operation and recovery operation, and the use amount of the viscosity controlling agent is, for example, about 0.01 to 1% by mass, preferably about 0.1 to 0.5% by mass in the fracturing fluid.

In the viscosity controlling agent according to the present invention, the arrangement of the polyalkylene oxide and the viscosity reducing agent in the tablet is not particularly limited, and examples thereof include a matrix type in which the polyalkylene oxide and the viscosity reducing agent are uniformly dispersed in the tablet, and a core-shell type in which the viscosity reducing agent is situated at the central part (core part) of the tablet and the polyalkylene oxide is situated at the periphery (shell part) of the viscosity reducing agent. In the case where the tablet is of core-shell type, a period of time until the viscosity is decreased to a viscosity suitable for recovery can be increased because dispersion (dissolution) of the viscosity reducing agent in the fracturing fluid is slower as compared to the matrix type.

The viscosity controlling agent according to the present invention can be produced by mixing a polyalkylene oxide, a viscosity reducing agent, and other components as necessary, and molding the mixture into a tablet shape. That is, the viscosity controlling agent can be produced by mixing a polyalkylene oxide, a viscosity reducing agent, and other components as necessary to form a composition, and molding the composition into a tablet shape.

In the case of, for example, the matrix type, the viscosity controlling agent according to the present invention can be produced by uniformly mixing a powder of the polyalkylene oxide with a powder of the viscosity reducing agent, and molding the mixture into a tablet shape using a tableting machine etc. In the case of the core-shell type, the viscosity controlling agent can be produced by arranging a powder of the viscosity reducing agent and a powder of the polyalkylene oxide in such a manner that the former is situated at the central part and the latter is situated at the periphery thereof, and performing molding using a tableting machine etc. The tableting pressure can be appropriately set according to the mass (size or the like of an intended tablet.

When the viscosity controlling agent according to the present invention is used in a fracturing fluid in hydraulic fracturing, the fracturing fluid can be caused to retain a high viscosity during fracture formation operation in hydraulic fracturing and to have a reduced viscosity during fracturing fluid recovery operation. Therefore, the viscosity controlling agent can be suitably used as a viscosity controlling agent that is used for controlling a change in viscosity of a fracturing fluid to be used in hydraulic fracturing.

<Fracturing Fluid>

The fracturing fluid according to the present invention contains the above-mentioned viscosity controlling agent, water a support material (proppant) and a gelling agent. The fracturing fluid according to the present invention is a fluid that is used in hydraulic fracturing and injected under pressure into a well. The water is not particularly limited, and for example, ground water, river water, rain water, industrial water, city water or the like can be used. The ratio of water in the fracturing fluid is normally about 90 to 99% by mass.

The support material is not particularly limited, and a support material that is used in a known fracturing fluid can be used. Examples of the support material include sand, gravel, walnut shell, and minerals such as talc and bentonite. The support materials may be used alone, or may be used in combination of two or more thereof. The ratio of the support material in the fracturing fluid is normally about 0.1 to 1% by mass.

The gelling agent is not particularly limited, and a gelling agent that is used in a known fracturing fluid can be used. Specific examples of the gelling agent include hydrating polymer compounds such as polysaccharides, polyacrylamides, polyacrylamide copolymers and polyalkylene oxides. The polysaccharide is not particularly limited, but it is preferably guar gum, locust bean gum, carboxymethyl gum, karaya gum, sodium carboxymethyl guar, hydroxyethyl guar, hydroxypropyl guar, sodium hydroxymethyl cellulose, sodium carboxymethyl hydroxyethyl cellulose, hydroxymethyl cellulose, hydroxyethyl cellulose or the like. The gelling agents may be used alone, or may be used in combination of two or more thereof. The ratio of the gelling agent in the fracturing fluid is normally about 0.1 to 1% by mass.

The fracturing fluid according to the present invention may further contain other additives that are contained in a known fracturing fluid, such as a crosslinker and a surfactant. Specific examples of the crosslinker include polyvalent metal ions such as those of chromium (III), aluminum (III) and titanium (IV), and polyvalent anions such as borates.

The fracturing fluid according to the present invention can be easily produced by mixing water, a viscosity controlling agent, a support material, a gelling agent, and other additives as necessary. The fracturing fluid according to the present invention contains the above-mentioned viscosity controlling agent, and thus can be suitably used as a fracturing fluid to be used in hydraulic fracturing. Further, as described later, the fracturing fluid according to the present invention can be suitably used as a fracturing fluid to be injected under pressure in a method for mining crude oil or natural gas.

The viscosity of the fracturing fluid according to the present invention is not particularly limited, and may be the same as that of a known fracturing fluid. The viscosity of the fracturing fluid to be used in fracture formation operation is, for example, about 500 to 2,000 mPa·s. The viscosity of the fracturing fluid in recovery of the fracturing fluid is, for example, 100 mPa·s or less. In the present invention, the method for measuring the viscosity of the fracturing fluid is as follows. The fracturing fluid is placed in a thermostatic bath at 25° C. for 30 minutes or more, and the viscosity is measured using a B-type rotational viscometer (rotation number: 12 rpm, 3 minutes, 25° C.).

<Method for Mining Crude Oil or Natural Gas>

The method for mining crude oil or natural gas according to the present invention includes the steps of: forming a mining hole in a stratum; introducing the fracturing fluid according to the present invention into the mining hole to form a fracture in a part of the stratum; and mining crude oil or natural gas from the mining hole. The steps of forming a mining hole in a stratum; introducing the fracturing fluid into the mining hole to form a fracture in a part of the stratum; and recovering crude oil or natural gas from the mining hole can be carried out in accordance with a known mining method. In the method for mining crude oil or natural gas according to the present invention, a fracturing fluid containing the viscosity controlling agent according to the present invention is used, and thus the fracturing fluid can be caused to retain a high viscosity during fracture formation operation and to have a reduced viscosity during fracturing fluid recovery operation. Thus, in the method for mining crude oil or natural gas according to the present invention, crude oil or natural gas can be efficiently mined.

EXAMPLES

Hereinafter, the present invention will be described in detail by showing examples and comparative examples. However, the present invention is not limited to examples.

Example 1

First, 0.5 g of a polyethylene oxide (PEO-29 (trade name) manufactured by Sumitomo Seika Chemicals Company, Limited; viscosity in the form of a 0.5 mass % aqueous solution: 825 mPa·s) and 0.0025 g of a radical generator (radical initiator) (ADVN: 2,2'-azobis(2,4'-dimethylvaleronitrile)) were dry-blended, added in a mortar with a diameter of 10 mm, and tableted at a pressure of 5 kN to obtain a tablet-shaped viscosity controlling agent (matrix type). One tablet of the viscosity controlling agent was added in a 0.5 mass % aqueous polyethylene oxide solution obtained by dissolving 2.5 g of the polyethylene oxide in 497.5 g of water, so that a fracturing fluid was obtained. A change in viscosity and viscosity retention rate in storage of the obtained fracturing fluid at 40° C. for a certain period of time (0 to 7 days) was examined. The results are shown in Table 1 (measured values) and FIGS. 1 and 2 (graphs). The amount of the radical generator (radical initiator) is 1000 ppm based on the amount of the polyethylene oxide in the aqueous polyethylene oxide solution.
<Method for Measuring Viscosity>

In examples and comparative examples, the viscosity of the polyethylene oxide used in the viscosity controlling agent was measured in the following manner. In 1-L beaker, 497.5 g of ion-exchanged water was added, of a sample was added therein while stirring was performed under the condition of a tip circumferential speed of 1.0 m/s using a flat plate with a width of 80 mm and a length of 25 mm, and stirring was continued for 3 hours to prepare an aqueous solution. The obtained aqueous solution was placed in a thermostatic bath at 25° C. for 30 minutes or more, and the viscosity was measured using a B-type rotational viscometer (rotation number: 12 rpm, 3 minutes, 25° C.).

The viscosity of the fracturing fluid obtained in each of examples and comparative examples was measured in the following manner. The fracturing fluid was placed in a thermostatic bath at 25° C. for 30 minutes or more, and the viscosity was measured using a B-type rotational viscometer (rotation number: 12 rpm, 3 minutes, 25° C.).
<Method for Measuring Viscosity Retention Rate>

In examples and comparative examples, the viscosity retention rate (viscosity decrease rate) was measured in the following manner. The viscosity of the fracturing fluid obtained in each of examples and comparative examples (viscosity A) as defined as a viscosity at day 0. The viscosity of the fracturing fluid after elapse of a predetermined period of time after storage at 40° C. was measured in the same manner as in the case of day 0 (viscosity B). The viscosity retention rate was calculated from the following equation using viscosity A and viscosity B.

viscosity $B$/viscosity $A$×100=viscosity retention rate (%)

Example 2

Except that a radical generator (radical initiator) was arranged at the central part (core part) of the tablet, and a polyethylene oxide was arranged at the periphery (shell part) of the radical generator (radical initiator) to form a tablet (core-shell type), the same procedure as in Example 1 was carried out to obtain a viscosity controlling agent. Next, in the same manner as in Example 1, a change in viscosity and viscosity retention rate in storage of the fracturing fluid obtained in Example 2 at 40° C. for a certain period of time was examined. The results are shown in Table 1 and FIG. 1.

Example 3

Except that 0.5 g of a polyethylene oxide (PEO-18 (trade name) manufactured by Sumitomo Seika Chemicals Company, Limited; viscosity in the form of a 0.5 mass % aqueous solution: 250 mPa·s) was used in preparation of a viscosity controlling agent, the same procedure as in Example 1 was carried out to obtain a viscosity controlling agent. Next, in the same manner as in Example 1, a change in viscosity and viscosity retention rate in storage of the fracturing fluid obtained in Example 3 at 40° C. for a certain period of time was examined. The results are shown in Table 1 and FIG. 1.

Example 4

Except that a radical generator (radical initiator) was arranged at the central part (core part) of the tablet, and a polyethylene oxide was arranged at the periphery (shell part) of the radical generator(radical initiator) to form a tablet (core-shell type), the same procedure as in Example 3 was carried out to obtain a viscosity controlling agent. Next, in the same manner as in Example 1, a change in viscosity and viscosity retention rate in storage of the fracturing fluid obtained in Example 4 at 40° C. for a certain period of time was examined. The results are shown in Table 1 and FIG. 1.

Example 5

Except that the radical generator (radical initiator) was changed from 0.0025 g of ADVN: 2,2'-azobis(2,4'-dimethylvaleronitrile) to 0.0025 g of ammonium persulfate in preparation of a viscosity controlling agent, the same procedure as in Example 1 was carried out to obtain a viscosity controlling agent. Next, in the same manner as in Example 1, a change in viscosity and viscosity retention rate in storage of the fracturing fluid obtained in Example 5 at 40° C. for a certain period of time was examined. The results are shown in Table 1 and FIG. 2.

Comparative Example 1

In 497.5 g of water, 2.5 g of a polyethylene oxide (PEO-29 (trade name) manufactured by Sumitomo Seika Chemicals Company, Limited; viscosity in the form of a 0.5 mass % aqueous solution: 825 mPa·s) was dissolved to obtain a 0.5 mass % aqueous polyethylene oxide solution as a fracturing fluid, and a change in viscosity and viscosity retention rate in storage of the fracturing fluid at 40° C. for a certain period of time was examined. The results are shown in Table 1 and FIGS. 1 and 2.

Comparative Example 2

In 497.5 g of water, 2.5 g of a polyethylene oxide (PEO-29 (trade name) manufactured by Sumitomo Seiko Chemicals Company, Limited; viscosity in the form of a 0.5 mass % aqueous solution: 825 mPa·s) was dissolved to obtain a 0.5 mass % aqueous polyethylene oxide solution, and to this solution was added 0.0025 g of a radical generator (radical initiator) (ADVN: 2,2'-azobis(2,4'-dimethylvaleronitrile)) to obtain a fracturing fluid. A change in viscosity and viscosity retention rate in storage of the fracturing fluid at 40° C. for a certain period of time was examined. The results are shown in Table 1 and FIGS. 1 and 2. The amount of the radical generator (radical initiator) is 1000 ppm based on the amount of the polyethylene oxide in the aqueous polyethylene oxide solution.

Comparative Example 3

In 497.5 g of water, 2.5 g of a polyethylene oxide (PEO-29 (trade name) manufactured by Sumitomo Seiko Chemicals Company, Limited; viscosity in the form of a 0.5 mass % aqueous solution: 825 mPa·s) was dissolved to obtain a 0.5 mass % aqueous polyethylene oxide solution, and to this solution was added 0.0025 g of ammonium persulfate to obtain a fracturing fluid. A change in viscosity and viscosity retention rate in storage of the fracturing fluid at 40° C. for a certain period of time was examined. The results are shown in Table 1 and FIG. 2. The amount of ammonium persulfate is 1000 ppm based on the amount of the polyethylene oxide in the aqueous polyethylene oxide solution.

Comparative Example 4

First, 0.5 g of polyvinyl alcohol (KURARAY POVAL PVA-403(trade name) manufactured by KURARAY CO., LTD.) and 0.0025 g of ammonium persulfate were dry-blended, added in a mortar with a diameter of 10 mm, and tabletted at a pressure of 5 kN to obtain a tablet-shaped viscosity controlling agent (matrix type). One tablet of the viscosity controlling agent was added in a 0.5 mass % aqueous polyethylene oxide solution obtain d by dissolving 2.5 g of the polyethylene oxide in 497.5 g of water, so that a fracturing fluid was obtained. A change in viscosity and viscosity retention rate in storage of the obtained fracturing fluid at 40° C., for a certain period of time (0 to 7 days) was examined. The results are shown in Table 1 and FIG. 2. The amount of the radical generator (radical initiator) is 1000 ppm based on the amount of the polyethylene oxide in the aqueous polyethylene oxide solution.

Example 6

First, 0.5 g of a polyethylene oxide (PEO-29 (trade name) manufactured by Sumitomo Seika Chemicals Company, Limited; viscosity in the form of a 0.5 mass % aqueous solution: 825 mPa·s) and 0.0025 g of a radical generator (radical initiator) (ADVN: 2,2'-azobis(2,4'-dimethylvaleronitrile)) were dry-blended, added in a mortar with a diameter of 10 mm, and tabletted at a pressure of 5 kN to obtain a tablet-shaped viscosity controlling agent (matrix type). One tablet of the viscosity controlling agent was added in a 0.5 mass % aqueous guar gum solution obtained by dissolving 2.5 g of guar gum (manufactured by Wako Pure Chemical Industries, Ltd.) in 497.5 g of water, so that a fracturing fluid was obtained. A change in viscosity and viscosity retention rate in storage of the obtained fracturing fluid at 40° C. for period of time (0 to 7 days) was examined. The results are shown in Table 1 and FIG. 3. The amount of the radical generator (radical initiator) is 1000 ppm based on the amount of guar gum in the aqueous guar gum solution.

Example 7

Except that the radical generator (radical initiator) was changed from 0.0025 g of ADVN: 2,2'-azobis(2,4'-dimethylvaleronitrile) to 0.0025 g of ammonium persulfate in preparation of a viscosity controlling agent, the same procedure as in Example 6 was carried out to obtain a viscosity controlling agent. Next, in the same manner as in Example 6, a change in viscosity and viscosity retention rate in storage of the fracturing fluid obtained in Example 7 at 40° C. for a certain period of time was examined. The results are shown in Table 1 and FIG. 3. The amount of ammonium persulfate is 1000 ppm based on the amount of guar gum in the aqueous guar gum solution.

Example 8

Except that the amount of ammonium persulfate was changed from 0.0025 g to 0.000625 g in preparation of a vise s controlling agent, the same procedure as in Example 7 was carried out to obtain a viscosity controlling agent. Next, in the same manner as in Example 6, a change in viscosity and viscosity retention rate in storage of the fracturing fluid obtained in Example 8 at 40° C. for a certain period of time was examined. The results are shown in Table 1 and FIGS. 3 and 4. The amount of ammonium persulfate is 250 ppm based on the amount of guar gum in the aqueous guar gum solution.

Example 9

In preparation of a viscosity controlling agent, 0.25 g of a polyethylene oxide (PEO-29 (trade name) manufactured by Sumitomo Seika Chemicals Company, Limited; viscosity in the form of a 0.5 mass % aqueous solution: 825 mPa·s) and 0.000625 g of ammonium persulfate were dry-blended, added in a mortar with a diameter of 5 mm, and tabletted at a pressure of 5 kN to obtain a tablet-shaped viscosity controlling agent (matrix type). Next, in the same manner as in Example 6, a change in viscosity and viscosity retention rate in storage of the fracturing fluid obtained in Example 9 at 40° C. for a certain period of time was examined. The results are shown in Table 1 and FIG. 4. The amount of ammonium persulfate is 250 ppm based on the amount of guar gum in the aqueous guar gum solution.

Example 10

In preparation of a viscosity controlling agent, 1.0 g of a polyethylene oxide (PEO-29 (trade name) manufactured by Sumitomo Seika Chemicals Company, Limited; viscosity in the form of a 0.5 mass % aqueous solution: 825 mPa·s) and 0.000625 g of ammonium persulfate were dry-blended, added in a mortar with a diameter of 10 mm, and tabletted at a pressure of 5 kN to obtain a tablet-shaped viscosity controlling agent (matrix type). Next, in the same manner as in Example 6, a change in viscosity and viscosity retention rate in storage of the fracturing fluid obtained in Example 10 at 40° C. for a certain period of time was examined. The results are shown in Table 1 and FIG. 4. The amount of ammonium persulfate is 250 ppm based on the amount of guar gum in the aqueous guar gum solution.

Example 11

In preparation of a viscosity controlling agent, 0.125 g of a polyethylene oxide (PEO-29 (trade name) manufactured by Sumitomo Seika Chemicals Company, Limited; viscosity in the form of a 0.5 mass % aqueous solution: 825 mPa·s) and 0.000625 g of ammonium persulfate were dry-blended, added in a mortar with a diameter of 5 mm, and tableted at a pressure of 5 kN to obtain a tablet-shaped viscosity controlling agent (matrix type). Next, in the same manner as in Example 6, a change in viscosity and viscosity retention rate in storage of the fracturing fluid obtained in Example 11 at 40° C. for a certain period of time was examined. The results are shown in Table 1 and FIG. 4. The amount of ammonium persulfate is 50 ppm based on the amount of guar gum in the aqueous guar gum solution.

Comparative Example 5

In 497.5 g of water, 2.5 g of guar gum (manufactured by Wako Pure Chemical Industries, Ltd.) was dissolved to obtain a 0.5 mass % aqueous guar gum solution as a fracturing fluid, and a change in viscosity and viscosity retention rate in storage of the fracturing fluid at 40° C. for a certain period of time was examined. The results are shown in Table 2 and FIG. 3.

Comparative Example 6

In 497.5 g of water, 2.5 g of guar gum (manufactured by Wako Pure Chemical Industries, Ltd.) was dissolved to obtain a 0.5 mass % aqueous guar gum solution, and to this solution was added 0.0025 g of a radical generator (radical initiator) (ADVN: 2,2'-azobis(2,4'-dimethylvaleronitrile)) to obtain a fracturing fluid. A change in viscosity and viscosity retention rate in storage of the fracturing fluid at 40° C. for a certain period of time was examined. The results are shown in Table 2 and FIG. 3. The amount of the radical generator (radical initiator) is 1000 ppm based on the amount of guar gum in the aqueous guar gum solution.

Comparative Example 7

In 497.5 g of water, 2.5 g of guar gum (manufactured by Wako Pure Chemical Industries, Ltd.) was dissolved to obtain a 0.5 mass % aqueous guar gum solution, and to this solution was added 0.0025 g of ammonium persulfate to obtain a fracturing fluid. A change in viscosity and viscosity retention rate in storage of the fracturing fluid at 40° C. for a certain period of time was examined. The results are shown in Table 2 and FIG. 3. The amount of ammonium persulfate is 1000 ppm based on the amount of guar gum in the aqueous guar gum solution.

Comparative Example 8

First, 0.5 g of polyvinyl alcohol (KURARAY POVAL PVA-403 (trade name) manufactured by KURARAY CO., LTD.) and 0.0025 g of a radical generator (radical initiator) (ADVN: 2,2'-azobis(2,4'-dimethylvaleronitrile)) were dry-blended, added in a mortar with a diameter of 10 nun, and tableted at a pressure of 5 kN to obtain a tablet-shaped viscosity controlling agent (matrix type). One tablet of the viscosity controlling agent was added in a 0.5 mass % aqueous guar gum solution obtained by dissolving 2.5 g of guar gum (manufactured by Wako Pure Chemical Industries, Ltd.) in 497.5 g of water, so that a fracturing fluid was obtained. A change in viscosity and viscosity retention rate in storage of the obtained fracturing fluid at 40° C. for a certain period of time (0 to 7 drag was examined. The results are shown in Table 2 and FIG. 3. The amount of the radical generator (radical initiator) is 1000 ppm based on the amount of guar gum in the aqueous guar gum solution.

Comparative Example 9

First, 0.5 g of polyvinyl alcohol (KURARAY POVAL PVA-403 (trade name) manufactured by KURARAY CO., LTD.) and 0.0025 g of ammonium persulfate were dry-blended, added in a mortar with a diameter of 10 mm, and tableted at a pressure of 5 kN to obtain a tablet-shaped viscosity controlling agent (matrix type). One tablet of the viscosity controlling agent was added in a 0.5 mass % aqueous guar gum solution obtained by dissolving 2.5 g of guar gum (manufactured by Wako Pure Chemical Industries. Ltd.) in 497.5 g of water, so that a fracturing fluid was obtained. A change in viscosity and viscosity retention rate in storage of the obtained fracturing fluid at 40° C. for a certain period of time (0 to 7 days) was examined. The results are shown in Table 2 and FIG. 3. The amount of ammonium persulfate is 1000 ppm based on the amount of guar gum in the aqueous guar gum solution.

Example 12

First, 0.5 g of a polyethylene oxide (PEO-29 (trade name) manufactured by Sumitomo Seika Chemicals Company, Limited; viscosity in the form of a 0.5 mass % aqueous solution: 825 mPa·s) and 0.0025 g of a radical generator (radical initiator) (ADVN: 2,2'-azobis(2,4'-dimethylvaleronitrile)) were dry-blended, added in a mortar with a diameter of 10 mm, and tableted at a pressure of 5 kN to obtain a tablet-shaped viscosity controlling agent (matrix type). One tablet of the viscosity controlling agent was added in a guar gum gel obtained by dissolving 2.5 g of guar gum (manufactured by Wako Pure Chemical Industries, Ltd.) and 0.25 g of sodium tetraborate (anhydrous) (manufactured by Wako Pure Chemical Industries, Ltd.) in 497.5 g of water, so that a fracturing fluid was obtained. A change in viscosity and viscosity retention rate in storage of the obtained fracturing fluid at 40° C. for a certain period of time (0 to 7 days) was examined. The results are shown in Table 2 and FIG. 5. The amount of the radical generator (radical initiator) is 1000 ppm based on the amount of guar gum in the guar gum gel.

Example 13

Except that the radical generator (radical initiator) was changed from 0.0025 g of ADVN: 2,2'-azobis(2,4'-dimethylvaleronitrile) to 0.0025 g of ammonium persulfate in preparation of a viscosity controlling agent, the same procedure as in Example 12 was carried out to obtain a viscosity controlling agent. Next, in the same manner as in Example 12, a change in viscosity and viscosity retention rate in storage of the fracturing fluid obtained in Example 13 at 40° C. for a certain period of time was examined. The results are shown in Table 2 and FIG. 5. The amount of ammonium persulfate is 1000 ppm based on the amount of guar gum in the guar gum gel.

Example 14

Except that the amount of ammonium persulfate was changed from 0.0025 g to 0.000625 g in preparation of a viscosity controlling agent, the same procedure as in Example 12 was carried out to obtain a viscosity controlling agent. Next, in the same manner as in Example 12, a change in viscosity and viscosity retention rate in storage of the fracturing fluid obtained in Example 14 at 40° C. for a certain period of time was examined. The results are shown in Table 2 and FIG. 5. The amount of ammonium persulfate is 250 ppm based on the amount of guar gum in the guar gum gel.

Example 15

Except that the amount of ammonium persulfate was changed to 0.00025 g in preparation of a viscosity controlling agent, the same procedure as in Example 13 was carried out to obtain a viscosity controlling agent. Next, in the same manner as in Example 13, a change in viscosity and viscosity retention rate in storage of the fracturing fluid obtained in Example 17 at 40° C. for a certain period of time was examined. The results are shown in Table 2 and FIG. 5. The amount of ammonium persulfate is 100 ppm based on the amount of guar gum in the guar gum gel.

Comparative Example 10

In 497.5 g of water, 2.5 g of guar gum (manufactured by Wako Pure Chemical Industries, Ltd.) and 0.25 g of sodium tetraborate (anhydrous) (manufactured by Wako Pure Chemical Industries, Ltd) were dissolved to obtain a 0.5 mass % guar gum gel as a fracturing fluid, and a change in viscosity and viscosity retention rate in storage of the fracturing fluid at 40° C. for a certain period of time was examined. The results are shown in Table 2 and FIG. 5.

Comparative Example 11

In 497.5 g of water, 2.5 g of guar gum (manufactured by Wako Pure Chemical Industries, Ltd.) and 0.25 a of sodium tetraborate (anhydrous) (manufactured by Wako Pure Chemical Industries, Ltd.) were dissolved to obtain a 0.5 mass % guar gum gel, and to this gel was added 0.0025 g of ammonium persulfate to obtain a fracturing fluid. A change in viscosity and viscosity retention rate in storage of the fracturing fluid at 40° C. for a certain period of time was examined. The results are shown in Table 2 and FIG. 5. The amount of the radical generator (radical initiator) is 1000 ppm based on the amount of guar gum in the guar gum gel.

Comparative Example 12

First, 0.5 g of polyvinyl alcohol (KURARAY POVAL PVA-403 (trade name) manufactured by KURARAY CO., LTD.) and 0.0025 g of ammonium persulfate were dry-blended, added in a mortar with a diameter of 10 mm, and tableted at a pressure of 5 kN to obtain a tablet-shaped viscosity controlling agent (matrix type). One tablet of the viscosity controlling agent was added to a 0.5 mass % guar gum gel obtained by dissolving 2.5 g of guar gum (manufactured by Wako Pure Chemical Industries, Ltd.) and 0.25 g of sodium tetraborate (anhydrous) (manufactured by Wako Pure Chemical Industries, Ltd.) in 497.5 g of water, so that a fracturing fluid was obtained. A change in viscosity and viscosity retention rate in storage of the obtained fracturing fluid at 40° C. for a certain period of time (0 to 7 days) was examined. The results are shown in Table 2 and FIG. 5. The amount of ammonium persulfate is 1000 ppm based on the amount of guar gum in the guar gum gel.

TABLE 1

| | Composition of fracturing fluid | | Concentration | | Viscosity in storage at 40° C. (mPa · S) | | | |
|---|---|---|---|---|---|---|---|---|
| | Composition of components other than viscosity controlling agent | Composition of viscosity controlling agent | of viscosity reducing agent | Tablet shape (0.5 g/φ 10 mm) | Day 0 | Day 1 | Day 2 | Day 3 |
| Example 1 | 0.5% Aqueous polyethylene oxide solution | polyethylene oxide (viscosity: 825 mPa · s) + radical initiator (ADVN) | 1,000 ppm | Matrix | 825 | 775 | 665 | 360 |
| Example 2 | 0.5% Aqueous polyethylene oxide solution | Polyethylene oxide (viscosity: 825 mPa · s) + radical initiator (ADVN) | 1,000 ppm | Core-shell | 825 | 785 | 700 | 625 |
| Example 3 | 0.5% Aqueous polyethylene oxide solution | Polyethylene oxide (viscosity: 250 mPa · s) + radical initiator (ADVN) | 1,000 ppm | Matrix | 825 | 700 | 450 | 135 |
| Example 4 | 0.5% Aqueoos polyethylene oxide solution | Polyethylene oxide (viscosity: 250 mPa · s) + radical initiator (ADVN) | 1,000 ppm | Core-shell | 825 | 765 | 580 | 260 |
| Example 5 | 0.5% Aqueous polyethylene oxide solution | Polyethylene oxide (viscosity: 825 mPa · s) + ammonium persulfate | 1,000 ppm | Matrix | 785 | 690 | 340 | 100 |
| Comparative Example 1 | 0.5% Aqueous polyethylene oxide solution | None | — | — | 825 | 785 | 735 | 700 |
| Comparative Example 2 | 0.5% Aqueous polyethylene oxide solution | Radical initiator (ADVN) alone | 1,000 ppm | Directly added | 825 | 285 | 85 | 35 |
| Comparative Example 3 | 0.5% Aqueous polyethylene oxide solution | Ammonium persulfate alone | 1,000 ppm | Directly added | 790 | 190 | 70 | 30 |
| Comparative Example 4 | 0.5% Aqueous polyethylene oxide solution | PVA + ammonium persulfate | 1,000 ppm | Matrix | 780 | 415 | 195 | 80 |
| Example 6 | 0.5% Aqueous guar gum solution | Polyethylene oxide (viscosity: 825 mPa · s) + radical initiator (ADVN) | 1,000 ppm | Matrix | 460 | 460 | 445 | 85 |
| Example 7 | 0.5% Aqueous guar gum solution | Polyethylene oxide (viscosity: 825 mPa · s) + ammonium persulfate | 1,000 ppm | Matrix | 520 | 415 | 85 | 0 |

TABLE 1-continued

| | | | | | | | | | |
|---|---|---|---|---|---|---|---|---|---|
| Example 8 | 0.5% Aqueous guar gum solution | Polyethylene oxide (viscosity: 825 mPa · s) + ammonium persulfate | 250 ppm | Matrix | 460 | 405 | 300 | 165 |
| Example 9 | 0.5% Aqueous guar gum solution | Polyethylene oxide (viscosity: 825 mPa · s) + ammonium persulfate | 250 ppm | Matrix (0.25 g/φ 5 mm) | 430 | 355 | 235 | 70 |
| Example 10 | 0.5% Aqueous guar gum solution | Polyethylene oxide (viscosity: 825 mPa · s) + ammonium persulfate | 250 ppm | Matrix (1.0 g/φ 5 mm) | 460 | 460 | 385 | 265 |
| Example 11 | 0.5% Aqueous guar gum solution | Polyethylene oxide (viscosity: 825 mPa · s) + ammonium persulfate | 250 ppm | Matrix (0.125 g/φ 5 mm) | 435 | 270 | 140 | 40 |

| | Viscosity in storage at 40° C. (mPa · S) | | | Viscosity retention rate (%) | | | | | | |
|---|---|---|---|---|---|---|---|---|---|---|
| | Day 4 | Day 5 | Day 7 | Day 0 | Day 1 | Day 2 | Day 3 | Day 4 | Day 5 | Day 7 |
| Example 1 | 175 | 85 | 70 | 100.0 | 93.9 | 80.6 | 43.6 | 21.2 | 10.3 | 8.5 |
| Example 2 | 510 | 365 | 250 | 100.0 | 95.2 | 84.8 | 75.8 | 61.8 | 44.2 | 30.3 |
| Example 3 | 55 | 35 | 25 | 100.0 | 84.8 | 54.5 | 16.4 | 6.7 | 4.2 | 3.0 |
| Example 4 | 90 | 40 | 25 | 100.0 | 92.7 | 70.3 | 31.5 | 10.9 | 4.8 | 3.0 |
| Example 5 | 40 | 15 | 0 | 100.0 | 87.9 | 43.3 | 12.7 | 5.1 | 1.9 | 0.0 |
| Comparative Example 1 | 690 | 685 | 660 | 100.0 | 95.2 | 89.1 | 84.8 | 83.6 | 83.0 | 80.0 |
| Comparative Example 2 | 10 | 0 | 0 | 100.0 | 34.5 | 10.3 | 4.2 | 1.2 | 0.0 | 0.0 |
| Comparative Example 3 | 0 | 0 | 0 | 100.0 | 24.1 | 8.9 | 3.8 | 0.0 | 0.0 | 0.0 |
| Comparative Example 4 | 0 | 0 | 0 | 100.0 | 53.2 | 25.0 | 10.3 | 0.0 | 0.0 | 0.0 |
| Example 6 | 60 | 35 | 0 | 100.0 | 100.0 | 96.7 | 18.5 | 13.0 | 7.6 | 0.0 |
| Example 7 | 0 | 0 | 0 | 100.0 | 79.8 | 16.3 | 0.0 | 0.0 | 0.0 | 0.0 |
| Example 8 | 65 | 15 | 0 | 100.0 | 88.0 | 65.2 | 35.9 | 14.1 | 3.3 | 0.0 |
| Example 9 | 25 | 0 | 0 | 100.0 | 82.6 | 54.7 | 16.3 | 5.8 | 0.0 | 0.0 |
| Example 10 | 130 | 25 | 0 | 100.0 | 100.0 | 83.7 | 57.6 | 28.3 | 5.4 | 0.0 |
| Example 11 | 0 | 0 | 0 | 100.0 | 62.1 | 32.2 | 9.2 | 0.0 | 0.0 | 0.0 |

TABLE 2

| | Composition of fracturing fluid | | Concentration of viscosity reducing agent | Tablet Shape | Viscosity in storage at 40° C. (mPa · S) | | | |
|---|---|---|---|---|---|---|---|---|
| | Composition of components other than viscosity controlling agent | Composition of viscosity controlling agent | | | Day 0 | Day 1 | Day 2 | Day 3 |
| Comparative Example 5 | 0.5% Aqueous guar gum solution | None | — | — | 520 | 465 | 470 | 435 |
| Comparative Example 6 | 0.5% Aqueous guar gum solution | Radical initiator (ADVN) alone | 1,000 ppm | Directly added | 540 | 195 | 0 | 0 |
| Comparative Example 7 | 0.5% Aqueous guar gum solution | Ammonium persulfate alone | 1,000 ppm | Directly added | 470 | 40 | 0 | 0 |
| Comparative Example 8 | 0.5% Aqueous guar gum solution | PVA + Radical initiator (ADVN) | 1,000 ppm | Matrix (0.5 g/φ 10 mm) | 570 | 230 | 55 | 0 |
| Comparative Example 9 | 0.5% Aqueous guar gum solution | PVA + ammonium persulfate | 1,000 ppm | Matrix (0.5 g/φ 10 mm) | 565 | 150 | 40 | 0 |
| Example 12 | 0.5% Aqueous guar gum solution + 0.05% Sodium tetraborate | Polyethylene oxide (viscosity: 825 mPa · s) + radical initiator (ADVN) | 1,000 ppm | Matrix (0.5 g/φ 10 mm) | 23,800 | 20,800 | 18,200 | 13,200 |
| Example 13 | 0.5% Aqueous guar gum solution + 0.05% Sodium tetraborate | Polyethylene oxide (viscosity: 825 mPa · s) + ammonium persulfate | 1,000 ppm | Matrix (0.5 g/φ 10 mm) | 25,600 | 30,600 | 11,600 | 2,660 |
| Example 14 | 0.5% Aqueous guar gum solution + 0.05% Sodium tetraborate | Polyethylene oxide (viscosity: 825 mPa · s) + ammonium persulfate | 250 ppm | Matrix (0.5 g/φ 10 mm) | 25,300 | 24,000 | 21,700 | 18,200 |
| Example 15 | 0.5% Aqueous guar gum solution + 0.05% Sodium tetraborate | Polyethylene oxide (viscosity: 825 mPa · s) + ammonium persulfate | 100 ppm | Matrix (0.5 g/φ 10 mm) | 26,000 | 25,600 | 23,800 | 21,800 |
| Comparative Example 10 | 0.5% Aqueous guar gum solution + 0.05% Sodium tetraborate | None | — | — | 26,800 | 26,800 | 26,800 | 23,700 |
| Comparative Example 11 | 0.5% Aqueous guar gum solution + 0.05% Sodium tetraborate | Ammonium persulfate alone | 1,000 ppm | Directly added | 24,800 | 740 | 0 | 0 |
| Comparative Example 12 | 0.5% Aqueous guar gum solution + 0.05% Sodium tetraborate | PVA + ammonium persulfate | 1,000 ppm | Matrix (0.5 g/φ 10 mm) | 25,800 | 14,200 | 5,900 | 0 |

TABLE 2-continued

|  | Viscosity in storage at 40° C. (mPa · S) | | | Viscosity retention rate (%) | | | | | | |
| --- | --- | --- | --- | --- | --- | --- | --- | --- | --- | --- |
|  | Day 4 | Day 5 | Day 7 | Day 0 | Day 1 | Day 2 | Day 3 | Day 4 | Day 5 | Day 7 |
| Comparative Example 5 | 420 | 405 | 350 | 100.0 | 89.4 | 90.4 | 83.7 | 80.8 | 77.9 | 67.3 |
| Comparative Example 6 | 0 | 0 | 0 | 100.0 | 36.1 | 0.0 | 0.0 | 0.0 | 0.0 | 0.0 |
| Comparative Example 7 | 0 | 0 | 0 | 100.0 | 8.5 | 0.0 | 0.0 | 0.0 | 0.0 | 0.0 |
| Comparative Example 8 | 0 | 0 | 0 | 100.0 | 40.4 | 9.6 | 0.0 | 0.0 | 0.0 | 0.0 |
| Comparative Example 9 | 0 | 0 | 0 | 100.0 | 26.5 | 7.1 | 0.0 | 0.0 | 0.0 | 0.0 |
| Example 12 | 6,800 | 2,100 | 0 | 100.0 | 87.4 | 76.5 | 55.5 | 28.6 | 8.8 | 0.0 |
| Example 13 | 700 | 0 | 0 | 100.0 | 80.5 | 45.3 | 10.4 | 2.7 | 0.0 | 0.0 |
| Example 14 | 10,000 | 3,500 | 65 | 100.0 | 94.9 | 85.8 | 71.9 | 39.5 | 13.8 | 0.3 |
| Example 15 | 15,500 | 5,380 | 800 | 100.0 | 98.5 | 91.5 | 83.8 | 59.6 | 20.7 | 3.1 |
| Comparative Example 10 | 18,400 | 13,000 | 10,700 | 100.0 | 100.0 | 100.0 | 88.4 | 68.7 | 48.5 | 39.9 |
| Comparative Example 11 | 0 | 0 | 0 | 100.0 | 3.0 | 0.0 | 0.0 | 0.0 | 0.0 | 0.0 |
| Comparative Example 12 | 0 | 0 | 0 | 100.0 | 55.0 | 22.9 | 0.0 | 0.0 | 0.0 | 0.0 |

As shown in Table 1 and FIG. 1, in Example 1, the viscosity was stable until day 1 with no significant difference as compared to Comparative Example 1 where the viscosity controlling agent was not used, but the viscosity started to rapidly decrease at day 3, and the viscosity retention rate decreased to about 10% at day 5. In Example the viscosity was stable until day 2 with no significant difference as compared to Comparative Example 1, but the viscosity started to decrease at day 3, and the viscosity retention rate decreased to about 30% at day 7. In Example 3, the viscosity was stable until day 1 with no significant difference as compared to Comparative Example 1. but the viscosity started to rapidly decrease at day 2, and the viscosity retention rate decreased to about 7% at day 4, In Example 4, the viscosity was stable until day 1 with no significant difference as compared to Comparative Example 1, but the viscosity started to rapidly decrease at day 2, and the viscosity retention rate decreased to about 11% at day 4. In Comparative Example 1, a high viscosity was retained with the viscosity retention rate being about 80% even at day 7. In Comparative Example 2, the viscosity retention rate decreased to about 35% at day 1, and the viscosity retention rate decreased to about 10% at day 2. From the results of examples and comparative examples, it has become evident that for the fracturing fluids of Examples 1 to 4 where a viscosity controlling agent containing a polyethylene oxide and a radical generator (radical initiator) was used, a high viscosity was retained over a certain period of time, and after elapse of the certain period of time, the viscosity was rapidly decreased. On the other hand, it has become evident that for the fracturing fluid of Comparative Example 1 where a viscosity controlling agent was not used, the viscosity was kept high, and for the fracturing fluid of Comparative Example 2 where no polyethylene oxide was used, the viscosity early decreased.

From comparison between Example 1 and Example 2 in FIG. 1, it is apparent that the viscosity can be controlled by changing the arrangement of a radical generator (radical initiator) in the tablet. From comparison between Example 1 and Example 3 and between Example 2 and Example 4, it is apparent that a change in viscosity of the fracturing fluid can be controlled by adjusting the viscosity of the polyethylene oxide to be used in the viscosity controlling agent.

Figure 2:
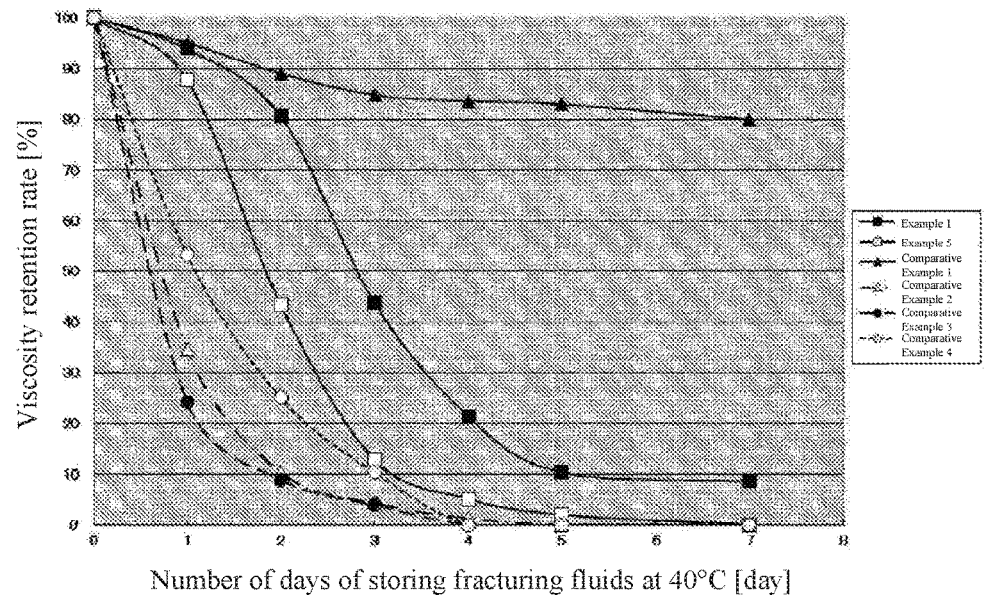
FIG. 2 is a graph showing a relationship between the number of days of storing fracturing fluids containing viscosity controlling agents obtained in Examples 1 and 5 and Comparative Examples 1 to 4 at 40° C. and the viscosity retention rate.

From the results of Example 5 shown in FIG. 2, it is apparent that the viscosity can be controlled also in the case where an ammonium salt of monopersulfuric acid is used as a viscosity reducing agent.

It is apparent that in the case where a viscosity reducing agent (radical generator) is not used as in Comparative Example 1 in FIG. 1, a decrease in viscosity is gentle, so that the fracturing fluid retains a high viscosity over a long period of time. On the other hand, it is apparent that when a radical generator or an ammonium salt of monopersulfuric acid as a viscosity reducing agent is not formed into a tablet, but added directly to the fracturing fluid as in Comparative Examples 2 and 3 in FIG. 2, the viscosity of the fracturing fluid rapidly decreases.

It is apparent that as shown in FIG. 2, in Comparative Example 4 where polyvinyl alcohol is used in the viscosity controlling agent in place of the polyethylene oxide, the viscosity of the fracturing fluid immediately starts to decrease, and thus it is impossible to retain a high viscosity for a certain period of time and decrease the viscosity after a certain period of time as in Examples 1 to 5.

Figure 3:
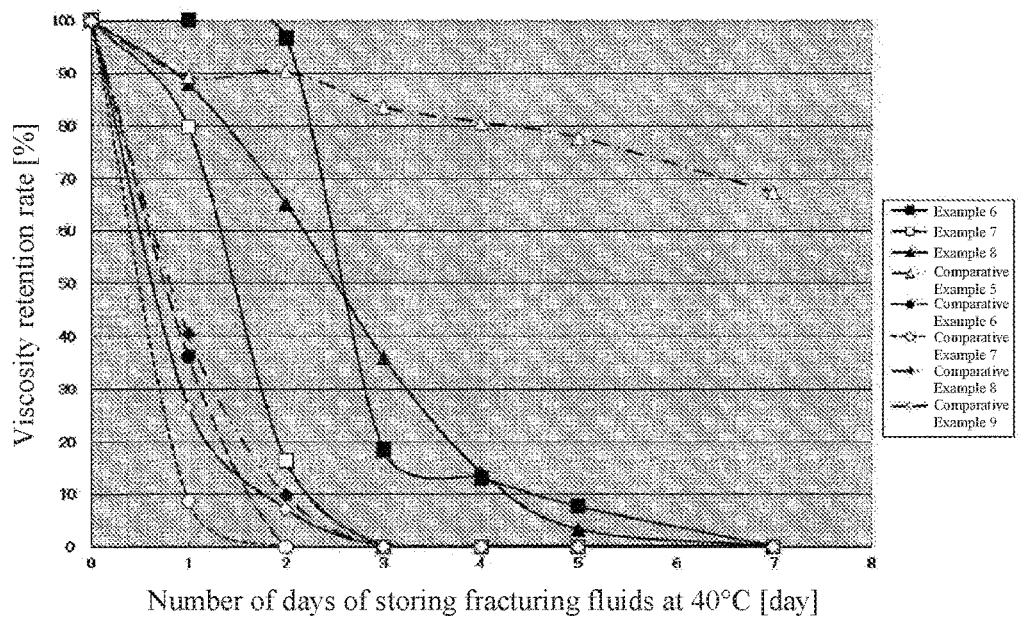
FIG. 3 is a graph showing a relationship between the number of days of storing fracturing fluids containing viscosity controlling agents obtained in Examples 6 to 8 and Comparative Examples 5 to 9 at 40° C. and the viscosity retention rate.

It is apparent that as shown in FIG. 3, the viscosity of the fracturing fluid can be adjusted also in Examples 6 and 7 where, as a composition of the fracturing fluid, an aqueous solution of guar gum (0.5%) as a polysaccharide is used in place of a 0.5% aqueous polyethylene oxide solution. From the results of Examples 7 and 8, it is also apparent that the viscosity of the fracturing fluid can be adjusted by controlling the added amount of the viscosity reducing agent.

Figure 4:
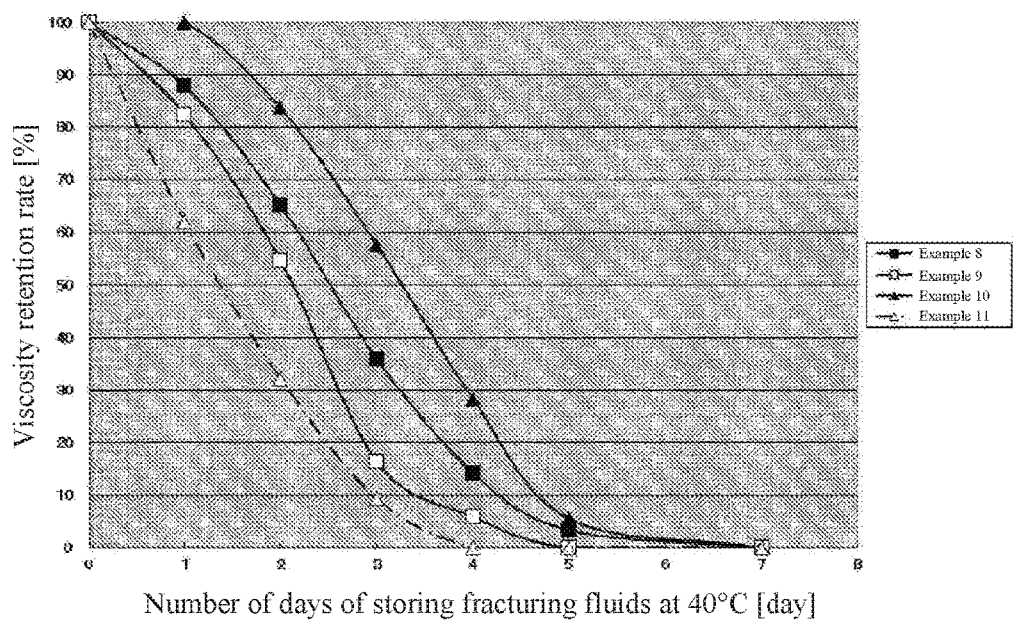
FIG. 4 is a graph showing a relationship between the number of days of storing fracturing fluids containing viscosity controlling agents obtained in Examples 8 to 11 at 40° C. and the viscosity retention rate.

From the results of Examples 8 to 11 shown in FIG. 4, it is apparent that the viscosity of the fracturing fluid can be adjusted by changing the mass (size) of a tablet to be used as the viscosity controlling agent.

It is apparent that as in Comparative Example 5 in FIG. 3, a decrease in viscosity is gentle when a viscosity reducing agent (radical generator) is not used, so that the fracturing fluid retains a high viscosity over a long period of time even in the case where, as a composition of the fracturing fluid, an aqueous solution of guar gum (0.5%) as a polysaccharide is used in place of a 0.5% aqueous polyethylene oxide solution. On the other hand, it is apparent that when a radical generator or an ammonium salt of monopersulfuric acid is not formed into a tablet, but added directly to the fracturing fluid as in Comparative Examples 6 and 7 in FIG. 3, the viscosity of the fracturing fluid rapidly decreases.

It is apparent that as in Comparative Examples 8 and 9 in FIG. 3, the viscosity of the fracturing fluid immediately starts to decrease when polyvinyl alcohol is used in the viscosity controlling agent in place of the polyethylene oxide, and thus it is impossible to retain a high viscosity for a certain period of time and decrease the viscosity after a certain period of time as in Examples 6 to 11 in FIG. 3 or FIG. 4 even in the case where, as a composition of the fracturing fluid, an aqueous solution of guar gum (0.5%) as a polysaccharide is used in place of a 0.5% aqueous polyethylene oxide solution.

Figure 5:
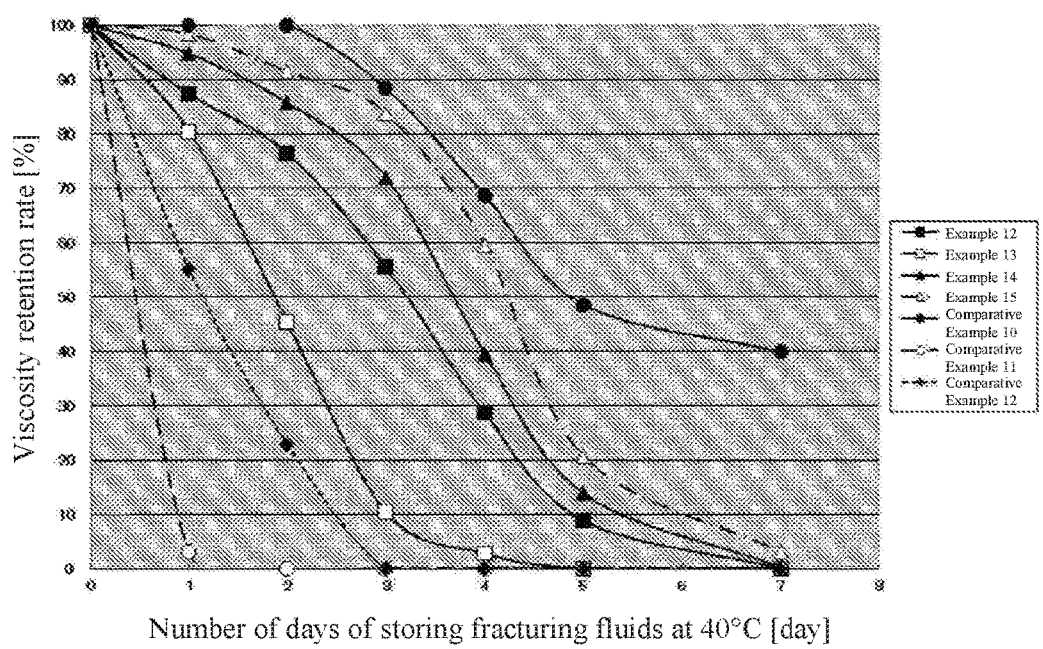
FIG. 5 is a graph showing a relationship between the number of days of storing fracturing fluids containing viscosity controlling agents obtained in Examples 12 to 15 and Comparative Examples 10 to 12 at 40° C. and the viscosity retention rate.

It is apparent that as shown in FIG. 5, the viscosity of the fracturing fluid can be adjusted also in Example 12 where an aqueous solution of sodium tetraborate (0.05%) and guar gum (0.5%) is used as the fracturing fluid. From Examples 12 to 15, it is apparent that also in the case where an aqueous solution of sodium tetraborate (0.05%) and guar gum (0.5%) is used as the fracturing fluid, the viscosity of the fracturing fluid can be adjusted by adjusting the type of the viscosity reducing agent, the concentration of the viscosity reducing agent, and so on.

It is apparent that as in Comparative Example 10 in FIG. 5, a decrease in viscosity is gentle when a viscosity reducing agent (radical generator) is not used, so that the fracturing fluid retains a high viscosity over a long period of time even in the case where an aqueous solution of sodium tetraborate (0.05%) and guar gum (0.5%) is used as the fracturing fluid. On the other hand, it is apparent that when a radical generator as a viscosity reducing agent is not formed into a tablet, but added directly to the fracturing fluid as in Comparative Example 11 in FIG. 5, the viscosity of the fracturing fluid rapidly decreases. It is apparent that in Comparative Example 12 where polyvinyl alcohol is used in the viscosity controlling agent in place of the polyethylene oxide, the viscosity of the fracturing fluid immediately starts to decrease, and thus it is impossible to retain a high viscosity for a certain period of time and decrease the viscosity after a certain period of time as in Examples 12 to 15.

What is claimed is:

1. A viscosity controlling agent for controlling a change in viscosity of a fracturing fluid to be used in hydraulic fracturing,
   wherein the viscosity controlling agent is in tablet form,
      wherein each tablet has a mass of 0.5 to 10 g, and comprises a polyalkylene oxide and a viscosity reducing agent,
   wherein the viscosity controlling agent is dissolved in the fracturing fluid, and the polyalkylene oxide has a viscosity of:
   (a) 20 to 1,500 mPa_s in a form of a 0.5 mass % aqueous solution at 25° C., or
   (b) 50 to 80,000 mPa_s in a form of a 5 mass % aqueous solution at 25° C.,
   wherein a ratio of the polyalkylene oxide in the viscosity controlling agent is 70 to 99.99% by mass relative to the total amount of the viscosity controlling agent,
   wherein the viscosity reducing agent is at least one selected from the group consisting of a radical generator, an acid and an enzyme.

2. The viscosity controlling agent according to claim 1, wherein the carbon number of a monomer unit that forms the polyalkylene oxide is in a range from 2 to 4.

3. The viscosity controlling agent according to claim 1, wherein the polyalkylene oxide contains at least one monomer unit selected from the group consisting of an ethylene oxide unit, a propylene oxide unit and a butylene oxide unit.

4. The viscosity controlling agent according to claim 1, wherein the polyalkylene oxide is at least one selected from the group consisting of a polyethylene oxide, a polypropylene oxide, a polybutylene oxide, an ethylene oxide-propylene oxide copolymer, an ethylene oxide-butylene oxide copolymer and a propylene oxide-butylene oxide copolymer.

5. A method for controlling a change in viscosity of a fracturing fluid to be used in hydraulic fracturing, the method comprising adding the viscosity controlling agent according to claim 1 to the fracturing fluid.

6. A fracturing fluid which is used in hydraulic fracturing, the fracturing fluid comprising the viscosity controlling agent according to claim 1, water, a support material and a gelling agent,
   wherein the viscosity controlling agent is dissolved in the fracturing fluid.

7. A method for mining crude oil or natural gas, the method comprising:
   forming a mining hole in a stratum;
   introducing the fracturing fluid according to claim 6 into the mining hole to form a fracture in a part of the stratum; and
   mining crude oil or natural gas from the mining hole.

* * * * *